US008223001B2

(12) United States Patent
Sutardja

(10) Patent No.: US 8,223,001 B2
(45) Date of Patent: Jul. 17, 2012

(54) TWO WAY REMOTE CONTROL

(75) Inventor: Sehat Sutardja, Los Altos Hills, CA (US)

(73) Assignees: Marvell International Ltd., Hamilton (BM); Marvell World Trade Ltd., St. Michael (BB)

( * ) Notice: Subject to any disclaimer, the term of this patent is extended or adjusted under 35 U.S.C. 154(b) by 1399 days.

(21) Appl. No.: 11/449,190

(22) Filed: Jun. 8, 2006

(65) Prior Publication Data

US 2007/0018845 A1 Jan. 25, 2007

Related U.S. Application Data

(63) Continuation of application No. 11/242,590, filed on Oct. 3, 2005, now abandoned.

(60) Provisional application No. 60/700,845, filed on Jul. 19, 2005, provisional application No. 60/702,341, filed on Jul. 25, 2005.

(51) Int. Cl.
*G05B 11/01* (2006.01)

(52) U.S. Cl. .................................................... 340/12.22

(58) Field of Classification Search ............. 340/825.69, 340/825.72, 825.22, 12.22, 5.61, 7.24; 341/176; 348/14.05; 725/139
See application file for complete search history.

(56) References Cited

U.S. PATENT DOCUMENTS 5,226,090 A 7/1993 Kimura
5,381,142 A 1/1995 Simmons
5,650,831 A 7/1997 Farwell
5,909,183 A * 6/1999 Borgstahl et al. ........ 340/825.22
6,100,814 A 8/2000 Doyle
6,141,022 A * 10/2000 Anfossi et al. ................ 345/545
6,208,271 B1 3/2001 Armstrong
6,263,503 B1 * 7/2001 Margulis ......................... 725/81
6,407,779 B1 6/2002 Herz
6,747,566 B2 6/2004 Hou
6,870,570 B1 3/2005 Bowser
6,970,127 B2 * 11/2005 Rakib ........................... 341/173
7,129,855 B2 10/2006 Krzyzanowski et al.
7,177,806 B2 2/2007 Washio
7,181,759 B2 * 2/2007 Oz et al. ......................... 725/119
2002/0140855 A1 10/2002 Hayes et al.
2002/0149705 A1 * 10/2002 Allen et al. ................... 348/734
2003/0125023 A1 * 7/2003 Fishler .......................... 455/426
2003/0188322 A1 * 10/2003 Bontempi ..................... 725/139
2003/0193426 A1 10/2003 Vidal
2004/0090315 A1 5/2004 Mackjust et al.
2004/0152414 A1 8/2004 Wang
2005/0024226 A1 2/2005 Hayes et al.

(Continued)

FOREIGN PATENT DOCUMENTS

EP 1 647 958 A 4/2006

(Continued)

OTHER PUBLICATIONS

Official Action with IPOS Search Report and Written Opinion Regarding Singapore Patent Application No. 200604302-0, dated Nov. 7, 2007, 15 pgs.

(Continued)

*Primary Examiner* — Vernal Brown

(57) ABSTRACT

A target device comprising a wireless interface that transmits configuration data to and receives commands from a remote control device. A control module that receives said commands and that adjusts operation of said target device based thereon; and a user input interface for locally adjusting operation of said target device.

32 Claims, 11 Drawing Sheets

U.S. PATENT DOCUMENTS

2006/0085579 A1 4/2006 Sato

FOREIGN PATENT DOCUMENTS

| | | |
|---|---|---|
| EP | 1647958 | 4/2006 |
| JP | 2002-158889 | 5/2002 |
| JP | 2003-115939 | 4/2003 |
| JP | 2004-266799 | 9/2004 |
| JP | 2005-039540 | 2/2005 |
| JP | 2005-184584 | 7/2005 |
| WO | WO2004/029896 | 4/2004 |
| WO | WO 2004/029896 A2 | 4/2004 |

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.

IEEE Std 802.11a-1999 (Supplement to IEEE Std 802.11-1999) [Adopted by ISO/IEC and redesignated as ISO/IEC 8802-11: 1999/Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.11b-1999/Cor 1-2001 (Corrigendum to IEEE Std 802.11-1999); IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 2: Higher-Speed Physical Layer (PHY) extension in the 2.4 GHz Band—Corrigendum 1; LAN/MAN Standards Committee of the IEEE Computer Society; Nov. 7, 2001; 23 pages.

IEEE P802.11g/D8.2, Apr. 2003 (Supplement to ANSI/IEEE Std 802.11-1999(Reaff 2003)); DRAFT Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE 802.11n; IEEE 802.11-04/0889r6; IEEE P802.11 Wireless LANs; TGn Sync Proposal Technical Specification; May 2005; 131 pages.

IEEE Standard 802.16-2004; IEEE Standard for Local and metropolitan area networks, Part 16: Air Interface for Fixed Broadband Wireless Access Systems, IEEE Computer Society and the IEEE Microwave Theory and Techniques Society; Oct. 1, 2004, 857 pages.

IEEE 802.20-PD-06; IEEE P 802.20 V 14, Draft 802.20 Permanent Document, System Requirements for IEEE 802.20 Mobile Broadband Wireless Access Systems—Version 14, Jul. 16, 2004, 23 pages.

Communication from European Patent Office dated Nov. 13, 2006 with extended European Search Report for Application No. 06013122.4—1249; 8 pages.

Communication from European Patent Office dated Nov. 13, 2006 with extended European Search Report for Application No. 06013123.2—1249; 9 pages.

IEEE Std 802.11h—2003 (Amendment to IEEE Std 802.11, 1999 Edition (Reaff 2003)); as amended by IEEE Stds 802.11a-1999, 802.11b-1999, 802.11b-1999/Cor 1-2001, 802.11d-2001, and 802.11g-2003; IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 5: Spectrum and Transmit Power Management Extensions in the 5 GHz band in Europe; IEEE Computer Society LAN/MAN Standards Committee; Oct. 14, 2003; 74 pages.

Specification of the Bluetooth System—Specification vol. 0; Master Table of Contents & Compliance Requirements; Covered Core Package version: 2.0 +EDR; Current Master TOC issued: Nov. 4, 2004; Part A, pp. 1-74; vol. 1, pp. 1-92; vol. 2 & 3, pp. 1-814; vol. 4, pp. 1-250.

Official Communication from European Patent Office dated Jul. 9, 2007 for Application No. 06 013 122.4-1249; 10 pages.

Official Communication from European Patent Office dated dated Jul. 9, 2007 for Application No. 06 013 123.2—1249; 15 pages.

Official Action including the Written Opinion and Search Report from the Intellectual Property Office of Singapore dated Oct. 11, 2007 for Application No. SG 200604302-0; 12 pages.

Notice of Reasons for Rejection issued Aug. 23, 2011, in corresponding Japanese Patent Application No. 2006-185881, and its English translation, 6 pages.

Notice of Reasons for Rejection issued Aug. 23, 2011, in corresponding Japanese Patent Application No. 2006-185860, and its English translation, 5 pages.

* cited by examiner

TWO WAY REMOTE CONTROL

CROSS-REFERENCE TO RELATED APPLICATIONS

This application is a continuation of U.S. patent application Ser. No. 11/242,590 filed on Oct. 3, 2005 now abandoned, which claims the benefit of U.S. Provisional Application No. 60/700,845,filed on Jul. 19, 2005,and U.S. Provisional Application No. 60/702,341,filed on Jul. 25, 2005,which are incorporated herein by reference in their entirety.

FIELD OF THE INVENTION

The present invention relates to remote control devices for electronic devices, and more particularly to two-way remote control devices for electronic devices.

BACKGROUND OF THE INVENTION

Remote control devices are one-way devices that send commands to target devices such as digital versatile disc (DVD) players, televisions (TVs), videocassette recorders (VCRs), set top boxes, stereos, and/or other devices. For example, a TV remote control device allows the user to change TV channels, adjust volume levels, turn the TV on or off, change contrast and/or adjust various other TV functions.

Typically, the remote control device that is provided with the target device is preprogrammed to work for the specific target device. Universal remote control devices can also be used. Universal remote control devices typically require a user to initiate a learn mode to identify a group of wireless codes for one or more target devices. This typically requires a user to input identification codes associated with the manufacturer of the target device and/or model designation information. If one of the codes does not work, the user must try other codes associated with the manufacturer. Furthermore, not all functions of the target device may be supported by the particular universal remote control device.

The universal remote control devices typically access a lookup table based on the identification codes that are input by the user. The lookup table stores groups of wireless codes for various devices. The lookup table associates keys of a keypad on the remote control device with the correct wireless codes for implementing a corresponding function on the selected target device.

As can be appreciated, there are several problems that arise when using this approach. With respect to universal remote control devices, the lookup table of the universal remote control must be pre-programmed to handle all of the target devices in advance. In other words, the consumer may purchase a universal remote control device and then subsequently purchase a new target device. The universal remote control device may or may not be able to be programmed to control the new target device.

SUMMARY OF THE INVENTION

A remote control device comprises a wireless interface that transmits data to and receives data from a target device that is to be controlled by remote control device. A user input interface generates user commands based on user inputs. A control module receives the user commands and wirelessly transmits the user commands to the target device via the wireless interface.

In other features, the user input interface includes buttons. The user input interface includes a touchpad. The wireless interface is compliant with a protocol selected from a group consisting of IEEE standard 802.11 and IEEE standard 802.11 amendments 802.11a, 802.11b, 802.11g, 802.11h, 802.11n, 802.16, 802.20 and Bluetooth. The wireless interface receives configuration information for the remote control device from the target device.

In other features, a display communicates with the control module. The remote control device receives streaming video data from the target device. The control module outputs the streaming video data to the display. The remote control device receives streaming audio data from the target device. The control module outputs the streaming audio data to an audio output. The audio output includes at least one of a speaker and an audio output jack. A microphone communicates with the control module and converts sound waves input thereto to sound signals. The target device forwards voice over Internet protocol (VOIP) data from the target device and forwards sound data to the target device from the microphone.

In other features, a system comprises the remote control device and further comprises the target device. The target device receives a source signal and includes first and second tuners for tuning channels in the source signal an a local output device. The remote control device includes at least one of a display that communicates with the control module and an audio output that communicates with the control module. The target device outputs signals from the first tuner via the local output device of the target device and selectively outputs signals from the second tuner via the at least one of the display and the audio output of the remote control device.

A system comprises the remote control device and further comprises the target device. The target device receives a source signal and includes first and second signal outputs. The remote control device includes at least one of a display that communicates with the control module and an audio output that communicates with the control module. The target device outputs one of signal outputs via the local output device of the target device and selectively outputs the other of the signal outputs via the at least one of the display and the audio output of the remote control device.

In other features, at least one of the signal outputs of the target device includes status information of the target device. At least one of the signal outputs of the target device includes a channel guide. At least one of the signal outputs of the target device includes close captions. The control module stores a unique network address a plurality of the target devices. The remote control device controls a plurality of the target devices.

In other features, a system comprises the remote control device and further comprises the target device. The target device includes a control module that performs at least one of data reduction and data compression on data to be sent to the remote control device. The control module includes memory that locally caches data.

In other features, a system comprises the remote control device and further comprises the target device that includes an autonegotiation module. The remote control device includes an autonegotiation module. The autonegotiation modules of the target device and the remote control device exchange data relating to capabilities of at least one of the target device and the remote control device. The data includes at least one type selected from a group consisting of memory size of the remote control device, functions supported by the remote control device, remote functions supported by the target device, display size of the remote control device, display resolution of the remote control device, output resolution of the target device, cache size of the remote control device and processing power of the remote control device.

In other features, the remote control device includes a power-down module that transitions the remote control device to a low power state after a predetermined inactivity time. A speech recognition module communicates with the microphone and recognizes commands for the remote control device in the audio signals.

A remote control device comprises wireless interface means for transmitting data to and receiving data from a target device that is to be controlled by the remote control device. User input interface means generates user commands based on user inputs. Control means receives the user commands and wirelessly transmits the user commands to the target device via the wireless interface means.

In other features, the user input interface means includes buttons. The user input interface means includes a touchpad. The wireless interface means is compliant with a protocol selected from a group consisting of IEEE standard 802.11 and IEEE standard 802.11 amendments 802.11a, 802.11b, 802.11g, 802.11h, 802.11n, 802.16, 802.20 and Bluetooth. The wireless interface means receives configuration information for the remote control device from the target device. Display means for displaying communicates with the control means. The remote control device receives streaming video data from the target device and the control means outputs the streaming video data to the display means.

In other features, audio output means outputs audio signals. The remote control device receives streaming audio data from the target device. The control means outputs the streaming audio data to the audio output means. The audio output means includes at least one of a speaker and an audio output jack. Microphone means communicates with the control means and converts sound waves input thereto to sound signals. The target device forwards voice over Internet protocol (VOIP) data from the target device and forwards sound data to the target device from the microphone means.

In other features, a system comprises the remote control device and further comprises the target device. The target device receives a source signal and includes first and second tuning means for tuning channels in the source signal and a local output device. The remote control device includes at least one of display means for displaying that communicates with the control means and audio output means for outputting audio that communicates with the control means. The target device outputs signals from the first tuning means via the local output device of the target device and selectively outputs signals from the second tuning means via the at least one of the display means and the audio output means of the remote control device.

In other features, a system comprises the remote control device and further comprises the target device. The target device receives a source signal and includes first and second signal outputs. The remote control device includes at least one of display means for displaying that communicates with the control means and audio output means for outputting audio that communicates with the control means. The target device outputs one of signal outputs via the local output device of the target device and selectively outputs the other of the signal outputs via the at least one of the display means and the audio output means of the remote control device. At least one of the signal outputs of the target device includes status information of the target device. At least one of the signal outputs of the target device includes a channel guide. At least one of the signal outputs of the target device includes close captions.

In other features, the control means stores a unique network address of a plurality of the target devices. The remote control device controls a plurality of the target devices.

In other features, a system comprises the remote control device and further comprises the target device. The target device includes control means for performing at least one of data reduction and data compression on data to be sent to the remote control device. The control means includes memory means for locally caching data.

In other features, a system comprises the remote control device and further comprises the target device that includes autonegotiation means for autonegotiating. The remote control device includes autonegotiation means for autonegotiating. The autonegotiation means of the target device and the remote control device exchange data relating to capabilities of at least one of the target device and the remote control device. The data includes at least one type selected from a group consisting of memory size of the remote control device, functions supported by the remote control device, remote functions supported by the target device, display size of the remote control device, display resolution of the remote control device, output resolution of the target device, cache size of the remote control device and processing power of the remote control device. In other features, the remote control device includes power-down means for transitioning the remote control device to a low power state after a predetermined inactivity time. Speech recognition means communicates with the microphone means and recognizes verbal commands for the remote control device.

A method for operating a remote control device comprises transmitting data to and receiving data from a target device that is to be controlled by remote control device; generating user commands based on user inputs; and wirelessly transmitting the user commands to the target device via the wireless interface.

In other features, the method includes receiving the user commands using buttons. The method includes receiving the user commands using a touchpad. The wireless interface is compliant with a protocol selected from a group consisting of IEEE standard 802.11 and IEEE standard 802.11 amendments 802.11a, 802.11b, 802.11g, 802.11h, 802.11n, 802.16, 802.20 and Bluetooth.

In other features, the method includes receiving configuration information for the remote control device from the target device. The method includes receiving streaming video data from the target device; and displaying the streaming video data at the remote control device. The method includes receiving streaming audio data from the target device; and outputting the streaming audio data to an audio output of the remote control device. The audio output includes at least one of a speaker and an audio output jack. The method includes converting sound waves input thereto to sound signals at the remote control device. The method includes forwarding voice over Internet protocol (VOIP) data from the target device to the remote control device; and forwarding sound signals to the target device.

In other features, the method includes tuning first and second channels in a source signal; outputting signals from the first channel via a local output device of the target device; and selectively outputting signals from the second tuner via the at least one of a display and an audio output of the remote control device. The method includes selecting first and second media sources of the target device; outputting signals from the first source via a local output device of the target device; and selectively outputting signals from the second source via the at least one of a display and an audio output of the remote control device. At least one of the media sources of the target device includes status information of the target device. At least one of the media sources of the target device includes a channel guide. At least one of the media sources of the target device includes close captions.

In other features, the method includes storing a unique network address a plurality of the target devices at the remote control device. The remote control device controls a plurality of the target devices. The method includes performing at least one of data reduction and data compression on data to be sent to the remote control device. The method includes locally caching data at the remote control device. The method includes exchanging data relating to capabilities of at least one of the target device and the remote control device and negotiating a functional parameter of the remote control device. The data includes at least one type selected from a group consisting of memory size of the remote control device, functions supported by the remote control device, remote functions supported by the target device, display size of the remote control device, display resolution of the remote control device, output resolution of the target device, cache size of the remote control device and processing power of the remote control device.

In other features, the method includes selectively transitioning the remote control device to a low power state after a predetermined inactivity time. The method includes using speech recognition to recognize verbal commands for the remote control device.

A computer program executed by a processor for operating a remote control device comprises transmitting data to and receiving data from a target device that is to be controlled by remote control device; generating user commands based on user inputs; and wirelessly transmitting the user commands to the target device via the wireless interface.

In other features, the computer program includes receiving the user commands using buttons. The computer program includes receiving the user commands using a touchpad. The wireless interface is compliant with a protocol selected from a group consisting of IEEE standard 802.11 and IEEE standard 802.11 amendments 802.11a, 802.11b, 802.11g, 802.11h, 802.11n, 802.16, 802.20 and Bluetooth.

In other features, the computer program includes receiving configuration information for the remote control device from the target device. The computer program includes receiving streaming video data from the target device; and displaying the streaming video data at the remote control device. The computer program includes receiving streaming audio data from the target device; and outputting the streaming audio data to an audio output of the remote control device. The audio output includes at least one of a speaker and an audio output jack. The computer program includes converting sound waves input thereto to sound signals at the remote control device. The computer program includes forwarding voice over Internet protocol (VOIP) data from the target device to the remote control device; and forwarding sound data to the target device from the microphone.

In other features, the computer program includes tuning first and second channels in a source signal; outputting signals from the first channel via a local output device of the target device; and selectively outputting signals from the second tuner via the at least one of a display and an audio output of the remote control device. The computer program includes selecting first and second media sources of the target device; outputting signals from the first source via a local output device of the target device; and selectively outputting signals from the second source via the at least one of a display and an audio output of the remote control device. At least one of the media sources of the target device includes status information of the target device. At least one of the media sources of the target device includes a channel guide. At least one of the media sources of the target device includes close captions.

In other features, the computer program includes storing a unique network address a plurality of the target devices at the remote control device. The remote control device controls a plurality of the target devices. The computer program includes performing at least one of data reduction and data compression on data to be sent to the remote control device. The computer program includes locally caching data at the remote control device. The computer program includes exchanging data relating to capabilities of at least one of the target device and the remote control device and negotiating a functional parameter of the remote control device. The data includes at least one type selected from a group consisting of memory size of the remote control device, functions supported by the remote control device, remote functions supported by the target device, display size of the remote control device, display resolution of the remote control device, output resolution of the target device, cache size of the remote control device and processing power of the remote control device.

In other features, the computer program includes selectively transitioning the remote control device to a low power state after a predetermined inactivity time. The computer program includes using speech recognition to recognizes verbal commands for the remote control device.

A target device comprises a wireless interface that transmits configuration data to and receives commands from a remote control device. A control module receives the commands and adjusts operation of the target device based thereon. A user input interface locally adjusts operating of the target device.

In other features, the wireless interface is compliant with a protocol selected from a group consisting of IEEE standard 802.11 and IEEE standard 802.11 amendments 802.11a, 802.11b, 802.11g, 802.11h, 802.11n, 802.16, 802.20 and Bluetooth. The wireless interface transmits streaming video data to the remote control device. The wireless interface transmits streaming audio data to the remote control device. The wireless interface transmits voice over Internet protocol (VOIP) data to the remote control device and receives voice data from the remote control device.

In other features, first and second tuners tune channels in a source signal. The target device outputs signals from the first tuner to a local output device and selectively outputs signals from the second tuner to the remote control device.

In other features, the target device outputs one of first and second signal outputs to a local output device and selectively outputs the other of the first and second signal outputs to the remote control device. At least one of the signal outputs of the target device includes signal outputs selected from a group consisting of status information of the target device, a channel guide and close captions.

In other features, the target device has a unique network address. The control module performs at least one of data reduction and data compression on data to be sent to the remote control device. The target device locally caches data at the remote control device. An autonegotiation module exchanges data with the remote control device relating to capabilities of at least one of the target device and the remote control device. The data includes at least one type selected from a group consisting of memory size of the remote control device, functions supported by the remote control device, remote functions supported by the target device, display size of the remote control device, display resolution of the remote control device, output resolution of the target device, cache size of the remote control device and processing power of the remote control device.

A method for operating a target device comprises providing a wireless interface; transmitting configuration data to a remote control device; receiving commands from the remote control device; and adjusting operation of the target device based thereon.

In other features, the wireless interface is compliant with a protocol selected from a group consisting of IEEE standard 802.11 and IEEE standard 802.11 amendments 802.11a, 802.11b, 802.11g, 802.11h, 802.11n, 802.16, 802.20 and Bluetooth. The method includes transmitting streaming video data to the remote control device using the wireless interface. The method includes transmitting streaming audio data to the remote control device using the wireless interface. The method includes transmitting voice over Internet protocol (VOIP) data to the remote control device and receiving voice data from the remote control device using the wireless interface.

In other features, the method includes tuning first and second channels in a source signal; outputting the first channel to a local output device at the target device; and selectively outputting signals from the second channel to the remote control device. The method includes selecting first and second signal outputs; outputting the first signal output to a local output device at the target device; and selectively outputting the second signal output to the remote control device.

In other features, at least one of the signal outputs of the target device includes signal outputs selected from a group consisting of status information of the target device, a channel guide and close captions. The method includes assigning the target device a unique network address. The method includes performing at least one of data reduction and data compression on data to be sent to the remote control device. The method includes locally caching data at the remote control device. The method includes exchanging data with the remote control device relating to capabilities of at least one of the target device and the remote control device. The data includes at least one type selected from a group consisting of memory size of the remote control device, functions supported by the remote control device, remote functions supported by the target device, display size of the remote control device, display resolution of the remote control device, output resolution of the target device, cache size of the remote control device and processing power of the remote control device.

A computer program executed by a processor for operating a target device comprises providing a wireless interface; transmitting configuration data to a remote control device; receiving commands from the remote control device; and adjusting operation of the target device based on the commands.

In other features, the wireless interface is compliant with a protocol selected from a group consisting of IEEE standard 802.11 and IEEE standard 802.11 amendments 802.11a, 802.11b, 802.11g, 802.11h, 802.11n, 802.16, 802.20 and Bluetooth. The computer program includes transmitting streaming video data to the remote control device using the wireless interface. The computer program includes transmitting streaming audio data to the remote control device using the wireless interface. The computer program includes transmitting voice over Internet protocol (VOIP) data to the remote control device and receiving voice data from the remote control device using the wireless interface.

In other features, the computer program includes tuning first and second channels in a source signal; outputting the first channel to a local output device at the target device; and selectively outputting signals from the second channel to the remote control device. The computer program includes selecting first and second signal outputs; outputting the first signal output to a local output device at the target device; and selectively outputting the second signal output to the remote control device.

In other features, at least one of the signal outputs of the target device includes signal outputs selected from a group consisting of status information of the target device, a channel guide and close captions. The computer program includes assigning the target device a unique network address. The computer program includes performing at least one of data reduction and data compression on data to be sent to the remote control device. The computer program includes locally caching data at the remote control device. The computer program includes exchanging data with the remote control device relating to capabilities of at least one of the target device and the remote control device. The data includes at least one type selected from a group consisting of memory size of the remote control device, functions supported by the remote control device, remote functions supported by the target device, display size of the remote control device, display resolution of the remote control device, output resolution of the target device, cache size of the remote control device and processing power of the remote control device.

A target device comprises wireless interface means for transmitting configuration data to and receiving commands from a remote control device. Control means receives the commands and adjusts operation of the target device based thereon. User input interface means locally adjusts operation of the target device.

In other features, the wireless interface means is compliant with a protocol selected from a group consisting of IEEE standard 802.11 and IEEE standard 802.11 amendments 802.11a, 802.11b, 802.11g, 802.11h, 802.11n, 802.16, 802.20 and Bluetooth. The wireless interface means transmits streaming video data to the remote control device. The wireless interface means transmits streaming audio data to the remote control device. The wireless interface means transmits voice over Internet protocol (VOIP) data to the remote control device and receives voice data from the remote control device.

In other features, first and second tuning means tune channels in a source signal. Local output means outputs one of audio and video signals. The target device outputs signals from the first tuning means to the local output means and selectively outputs signals from the second tuning means to the remote control device.

In other features, the target device outputs one of first and second signal outputs to local output means for outputting at least one of audio and video and selectively outputs the other of the first and second signal outputs to the remote control device. At least one of the signal outputs of the target device includes signal outputs selected from a group consisting of status information of the target device, a channel guide and close captions.

In other features, the target device has a unique network address. The control means performs at least one of data reduction and data compression on data to be sent to the remote control device. The target device locally caches data at the remote control device. Autonegotiation means exchanges data with the remote control device relating to capabilities of at least one of the target device and the remote control device. The data includes at least one type selected from a group consisting of memory size of the remote control device, functions supported by the remote control device, remote functions supported by the target device, display size of the remote control device, display resolution of the remote control device, output resolution of the target device, cache size of the remote control device and processing power of the remote control device.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1A:
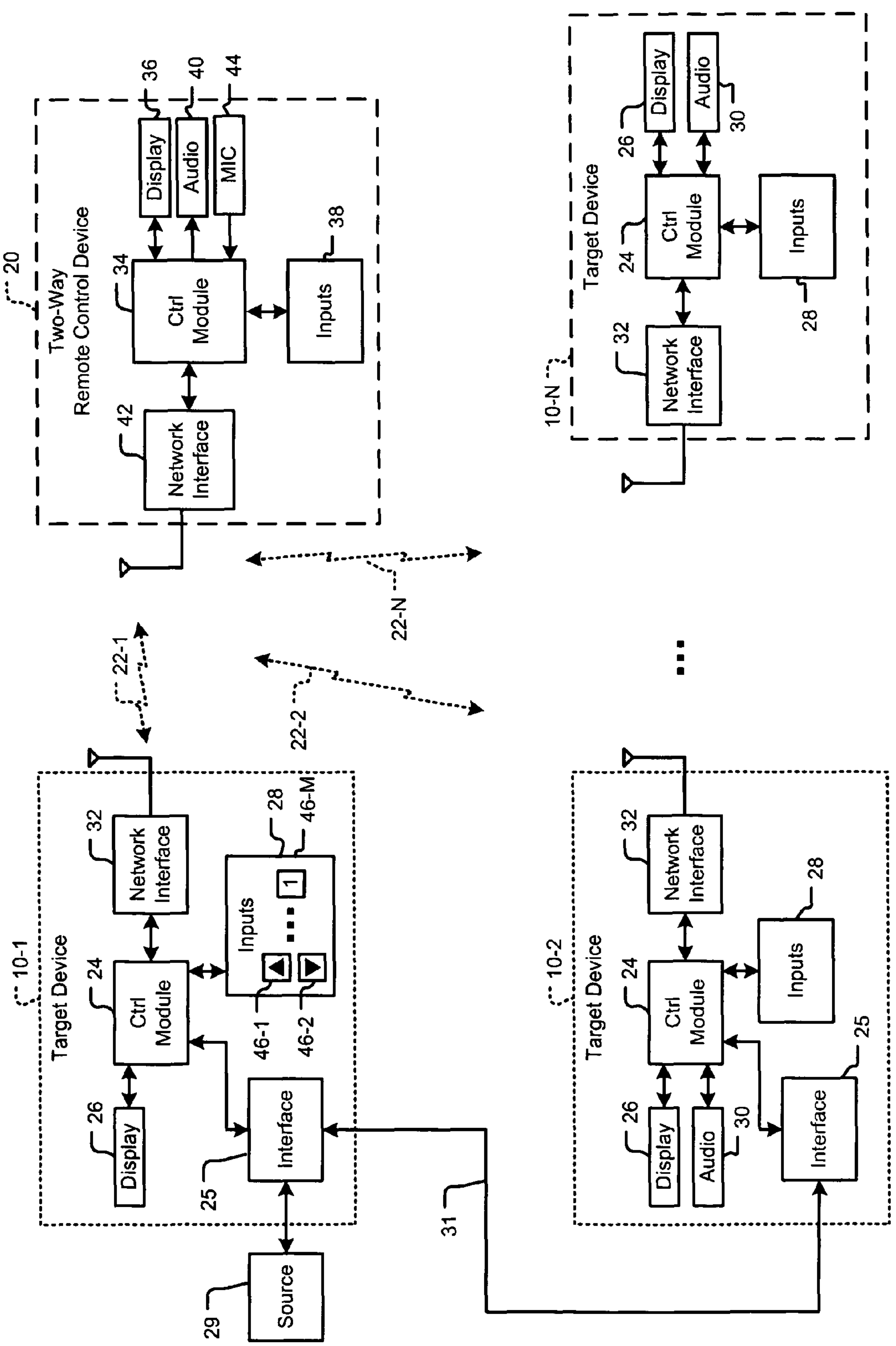
FIG. 1A is a functional block diagram illustrating one or more target devices that can be remotely controlled using a first exemplary remote control device via a two-way wireless connection according to the present invention.

The following description of the preferred embodiment(s) is merely exemplary in nature and is in no way intended to limit the invention, its application, or uses. As used herein, the term module, circuit and/or device refers to an Application Specific Integrated Circuit (ASIC), an electronic circuit, a processor (shared, dedicated, or group), and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present invention. For purposes of clarity, the same reference numbers will be used in the drawings to identify similar elements.

Figure 1C:
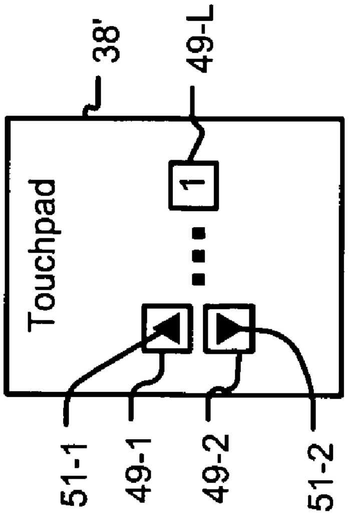
FIG. 1C illustrates an alternate configurable input/display for the remote control device of FIG. 1A.
Figure 1B:
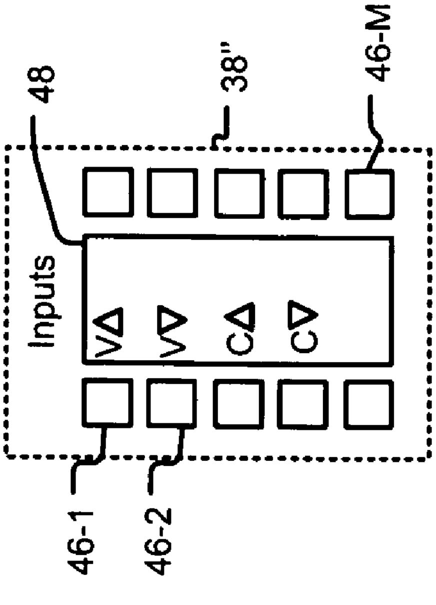
FIG. 1B illustrates an alternate touchpad input for the remote control device of FIG. 1A.

Referring now to FIGS. 1A-1C, one or more target devices 10-1, 10-2, . . . , and 10-N (collectively target devices 10) are remotely controlled using a first exemplary remote control device 20 via two-way wireless connections 22-1, 22-2, . . . and 22-N (collectively wireless connections 22). The target devices 10 may include any electronic device that can be controlled remotely. The target devices 10 may include one or more control modules 24, an input/output interface 25, a display 26, inputs 28, and an audio output 30. The inputs 28 may include buttons, keypads, displays, touchpads and/or combinations thereof. The audio output may include a speaker and/or audio output jack. The target devices 10 may be connected together as shown at 31. For example, a set top box may be connected to a television. An external source 29 such as a broadband connection, satellite radio, subscriber service, the Internet and/or other source may also be connected to the target device 10. The wireless connections 22 may be any suitable high speed connection that allows the transmission and reception of voice, video, audio and/or data.

According to the present invention, the target devices 10 include a wireless interface 32 that can be integrated with or separate from the target devices 10. The wireless interface 32 can be compliant with WiFi, 802.11, 802.11a, 802.11b, 802.11g, 802.11n, 802.16, 802.20,Bluetooth and/or the like and/or can be connected to a Local Area Network (LAN) via a wireless network interface. The control modules 24 perform control related functions for the target device 10 as well as output interactive information, control information and/or commands that are transmitted to the remote control device 20 via the network interface 32 and the wireless connection 22. While only one control module 24 is shown, the target device 10 may include a plurality of control modules 24 that distribute control functions of the target device 10.

The remote control device 20 sends commands to one or more target devices 10 to be controlled. The remote control device 20 may selectively send and/or receive configuration information, streaming video, streaming audio, data and/or other information via the wireless connection 22 to/from the target devices 10. The remote control device 20 may transmit configuration information that can include capabilities of the remote control device 20, available buttons on the remote control device 20, memory available at the remote control device 20, audio and/or video capabilities of the remote control device 20 and/or other capabilities of the remote control device 20. The target device configuration information can include capabilities of the target device 10, command groups (for example, including button identifications, wireless command information, symbols, icons, user instructions, and/or other information), memory available at the target device 10, audio and/or video capabilities of the target device and/or other attributes and/or capabilities of the target device 10.

The streaming video sent to the remote control device 10 may include television pictures, electronic programming guides, close captions, and/or other types of video as will be described further below. The data may include status data for the target device 10 such as time remaining, elapsed time, and/or other status information as will be described further below.

The remote control device 20 may include one or more control modules 34, a display 36, inputs 38, and/or an audio output 40. The inputs 38 may include buttons, touchpads, displays and/or combinations thereof. The audio output 40 may include a speaker and/or audio output jack. The remote control device 20 includes a wireless interface 42 that can be integrated with or that is separate from the remote control device 20. The remote control device 20 may further include a microphone (MIC) module 44 that converts sound waves to electronic signals and/or performs data encoding as needed and as will be described further below.

The inputs 38 of the remote control device 20 may include predefined buttons 46-1, 46-2, . . . and 46-M (collectively buttons 46) that are generic to many different devices as shown in FIG. 1A. For example, the remote control device 20 may have buttons 46 that are similar to those used by universal remote controls. The inputs 38 of the remote control device 20 may include buttons 46 that may be assigned different functions depending upon the target device 10 to be controlled. The buttons 46 may include corresponding configurable display portions 48 such as one or more light emitting diode (LED) displays that display an icon, brief description, symbol or other identification to help a user determine a current function of the button as shown in FIG.1B.

The inputs 38 may be provided by a configurable touchpad 38' or interactive display that may be integrated with the display 36 and/or separate from the display 36 as shown in FIG. 1C. In other words, the configurable touchpad 38' may provide visual representations 49-1, 49-2, . . . and 49-L (collectively visual representations 49) of a button and/or a button icon or label. When the user presses the visual representation 49 of the button on the touchpad 38', the remote control device 20 issues a command associated with the displayed button or icon. The visual representations 49 may incorporate labels, icons or other descriptions generally identified at 51-1, 51-2, . . . and 51-L for the command generated by the remote control device 20. Other visual aspects can be changed via the wireless interface to provide different functions.

By providing the touchpad 38' that can be reconfigured, the remote control device 20 can be reprogrammed to perform a different function using a different style or type of button. New types of devices may be accommodated. At least some of the buttons may be used to allow the user to select one target device from a group of target devices supported by the remote control device. As can be appreciated, the remote control device 20 may also employ drop-down menus and/or a point-and-click selection approach for selecting target devices and/or commands.

The control modules 34 perform control related functions for the remote control device 20 as well as output interactive information and/or commands that are sent to the target devices 10 via the network interface 42 and wireless connection 22. While only one control module is shown, the remote control device 20 may include a plurality of control modules that communicate and distribute various control functions.

The remote control device 20 receives interactive information such as audio, video, data, configuration information and/or other useful information from the target devices 10. In some implementations, the information transmitted between the remote control devices 20 and the target devices 10 is sent in packets and/or includes streaming audio and/or video data. The remote control device 20 may employ two-way wireless communications. The remote control device 20 may employ wireless fidelity (WIFI), and/or can be compliant with I.E.E.E. standard 802.11, any of the I.E.E.E. 802.11 amendments such as 802.11(a), 802.11(b), 802.11(g), 802.11(n), 802.16, 802.20,Bluetooth and/or other suitable wireless communication protocols.

Figure 2:
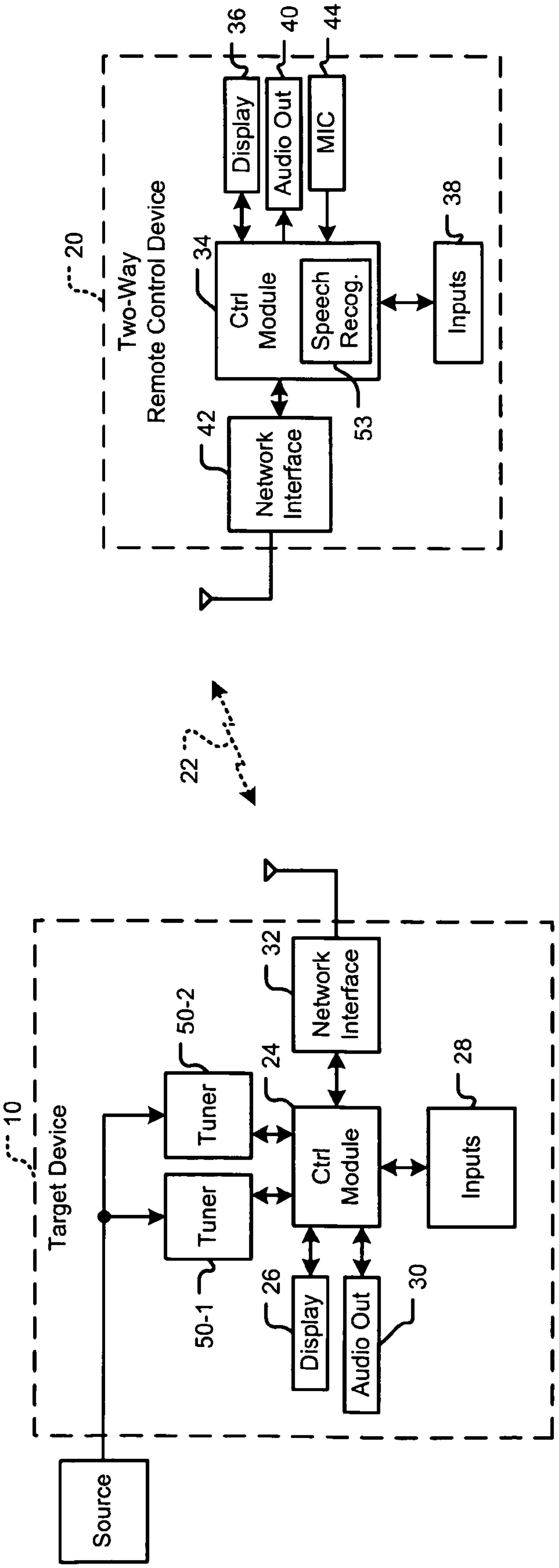
FIG. 2 is a functional block diagram of a second exemplary remote control device that allows a user of the remote control device to view and/or listen to one channel or source while the target device is playing one channel or source according to the present invention.

Referring now to FIG. 2, the remote control device 20 allows a user of the remote control device 20 to view and/or listen to one channel or source while the target device 10 is playing another channel or source. The remote control device 20 can perform many of the functions that would normally be performed by using inputs 38 or controls located at the target devices 10. For example in some television (TV) applications, the target device includes at least two tuners 50-1 and 50-2. Other devices may also be able to output two or more selections or sources. For example, an amplifier or other audio control unit may allow a user to select outputs of a radio tuner, tape player outputs, compact disc (CD) player, digital versatile disc (DVD)player, etc.

The control module may optionally include a speech recognition module 53 as shown in FIG. 2 that receives audio signals from the microphone. The speech recognition module 53 enables a user to speak commands for controlling the remote control device and/or the target device. The speech recognition module 53 may require training mode in some implementations.

The tuners may be connected to broadband service such as cable-based, phone-based, satellite-based, LAN-based, and/or WAN-based television (TV) services, internet services and/or conventional non-cable-based television services. In this example, the tuners can select different channels. The user of the remote control device 20 can view TV channels, TV guide, or other information that normally is displayed only on the TV screen or display 26 on the local display 36. As a result, the user can view different TV channels and/or the TV guide on the display 36 of the remote control device 20 without interrupting others who are currently watching the current program on the TV screen or display 26. In other words, the tuner 50-1 may be used to tune a first channel that is output to the display 26. The remote control device 20 can be used to tune a second channel that is output to the display 36 associated with the remote control device 20. In still other implementations, the local display may allow viewing of another source such as an output of a VCR or DVD while the TV displays a channel or vice-versa.

The remote control device 20 can display status information relating to the target devices 10. The status information would normally require the user to be in close proximity to the target device 10 to view the display 26 of the target device 10. For example for stereo, DVD or VCR systems, the remote control device 20 wirelessly receives settings of the particular system. For stereos, the information may include volume level, bass level, treble level, band information such as AM/FM/Satellite channel, radio data system (RDS) information, program information, etc. For DVD systems, the information may include digital versatile disk (DVD) chapter information, DVD menus and/or other information. For VCR systems, the information may include VCR elapsed time, etc. As a result, the user no longer needs to walk over to the target device 10 to view the display 26.

The remote control device 20 may control more than one of the same kind devices such as more than one TV, stereo, VCR, etc. In some implementations, a network address is assigned to each target device 10. The remote control device 20 stores a unique network address for the target devices 10. Learning the network address can be automated by placing the remote control device 20 close to the target device 10 during a learning mode. A low power transmit signal may be used to communicate with the target device 10 during the learning mode. When multiple target devices 10 are nearby, the remote control device 20 can automatically query the user to assign a simple number and/or label to each target device.

To reduce power, when the target device 10 needs to send a lot of information to the remote control device 20, the target device 10 performs data reduction such as compression or other data reduction. Local caching at the remote control device may be performed as well. This is important for target devices that are video-based, such as high definition television (HDTV) players or HDTV televisions. This approach can also be useful for storing web pages when using the remote control device to interface the Internet.

Other techniques for saving power are contemplated. The remote control device 20 can be in a sleep mode by default until a button or key is pressed. When the button is pressed, the remote control device 20 remains active until activity relating to the key press is complete and/or for a predetermined period thereafter. In other implementations, the remote control device 20 remains in a sleep mode until activity is detected. To that end, the remote control device 20 may keep a receiver active to detect signals from the target device while placing other circuits in low-power or off modes.

Figure 3:
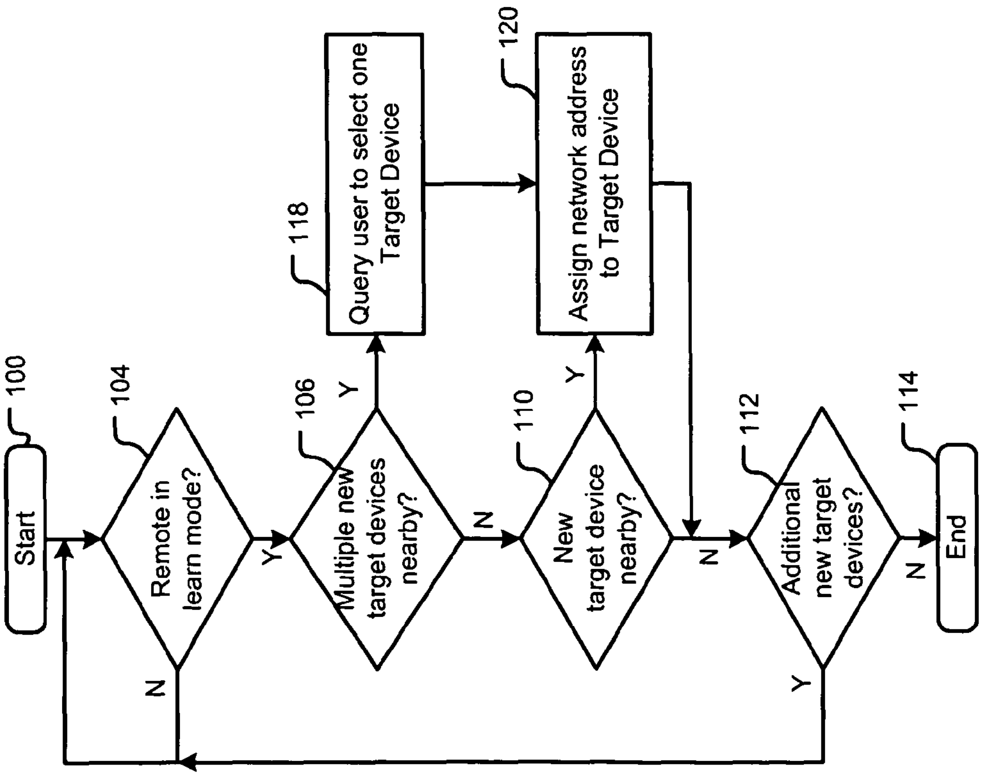
FIG. 3 is a flowchart illustrating steps for assigning network addresses to target devices.

Referring now to FIG. 3, steps for assigning network addresses to target devices 10 are shown. Control begins in step 100. In step 104, control determines whether the remote control device 20 is in a learning mode. The remote control device 20 may be placed in the learning mode by selecting a key on the remote control device and/or the target device 10. If step 104 is true, control continues with step 106 and determines whether multiple new target devices are located nearby. This decision may be based in part upon measured signal power of the target devices. If step 106 is false, control determines whether there is a single target device nearby. If step 110 is false, control determines whether there are additional new target devices in step 112. If step 112 is false, control returns to step 104.

If step 106 is true, control queries the user to select one of the new target devices in step 118. Control continues from steps 118 and 110 (when step 110 is true) with step 120. In step 120, control assigns network addresses to the selected target device and then control continues with step 112. Control ends when step 112 is false.

Figure 4:
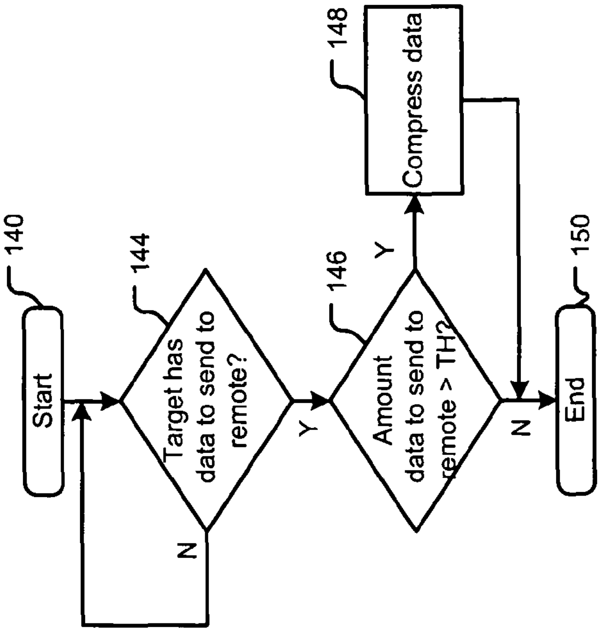
FIG. 4 is a flowchart illustrating steps for performing data compression by the target device.

Referring now to FIG. 4, steps for performing data compression by the target device 10 are shown. Control begins with step 140. In step 144, control determines whether the target device 10 has data to send to the remote control device 20. If step 144 is false, control returns to step 144. If step 144 is true, control compares the amount of data to be sent to the remote control device 20 to a predetermined threshold. If the amount of data is greater than the threshold as determined in step 146, the target device 10 compresses the data in step 148.

Figure 5:
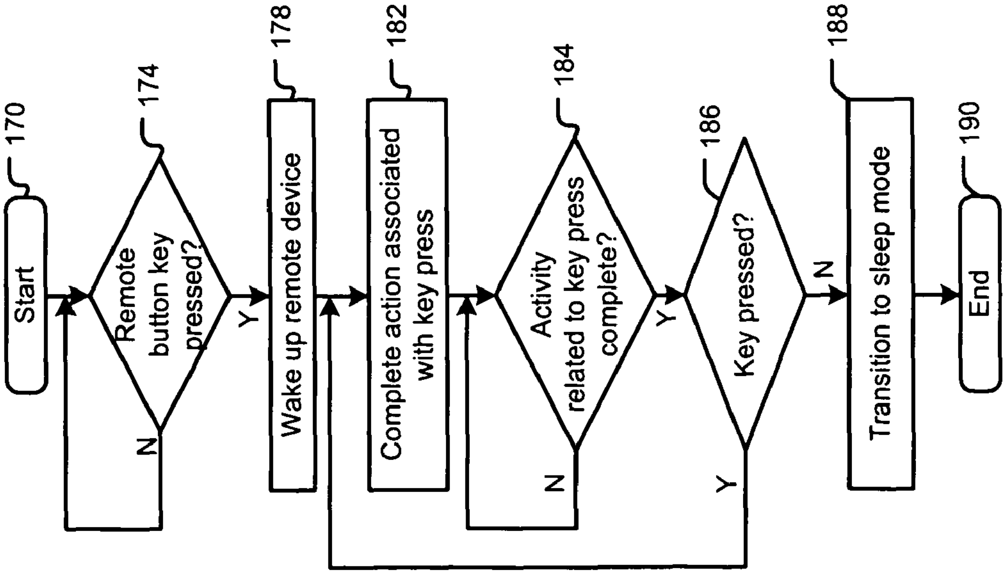
FIG. 5 is a flowchart illustrating steps for transitioning to and from a sleep or low power mode.

Referring now to FIG. 5, steps for transitioning to and from a sleep or low power mode are shown. Control begins with step 170. In step 174, control determines whether a remote button key has been depressed. If false, control returns to step 174. Otherwise, control wakes up the remote control device 20 in step 178 and completes the action associated with the key that was pressed in step 182. In step 184, control determines whether activity related to the key press is complete. If step 184 is false, control returns to step 184. If step 184 is true, control determines whether another key has been pressed in step 186. If step 186 is true, control returns to step 182. If step 186 is false, control transitions the remote control device 20 to the sleep mode in step 188.

Figure 6:
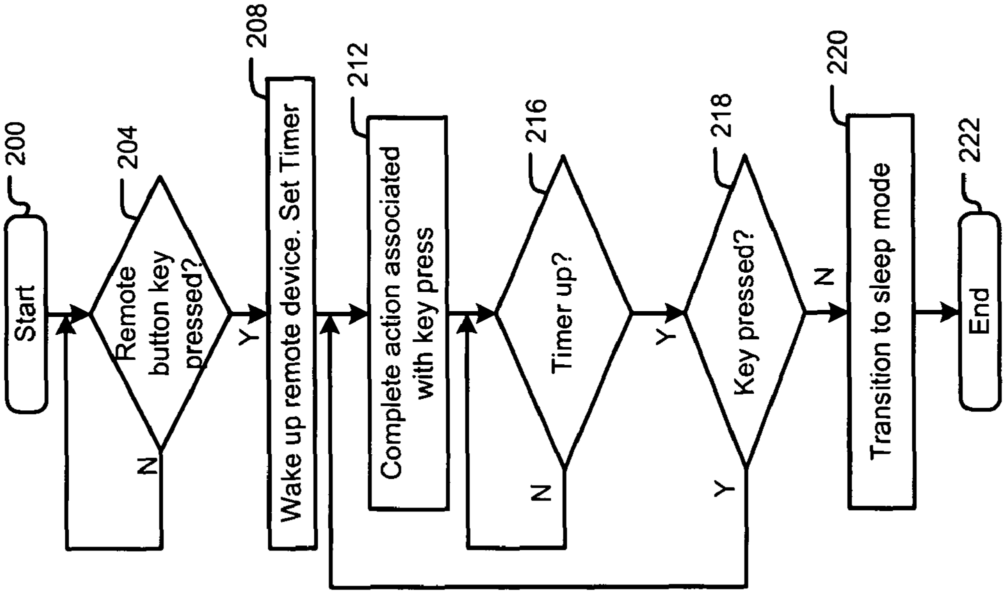
FIG. 6 is a flowchart illustrating alternate steps for transitioning to and from a sleep or low power mode.

Referring now to FIG. 6, alternative steps for transitioning to and from a sleep or low power mode are shown. Control begins with step 200. In step 204, control determines whether the remote button key has been depressed. If step 204 is false, control returns to step 204. Otherwise, control continues with step 208, transitions the remote control device 20 the sleep mode and resets a timer. In step 212, the remote control device 20 completes the action that is associated with the key press. In step 216, control determines whether the timer is up. If step 216 is false, control returns to step 216. Otherwise control continues with step 218 and determines whether another key has been pressed. If step 218 is true, control returns to step 212. Otherwise, control transitions to the sleep mode in step 220. Control ends in step 222.

Figure 7:
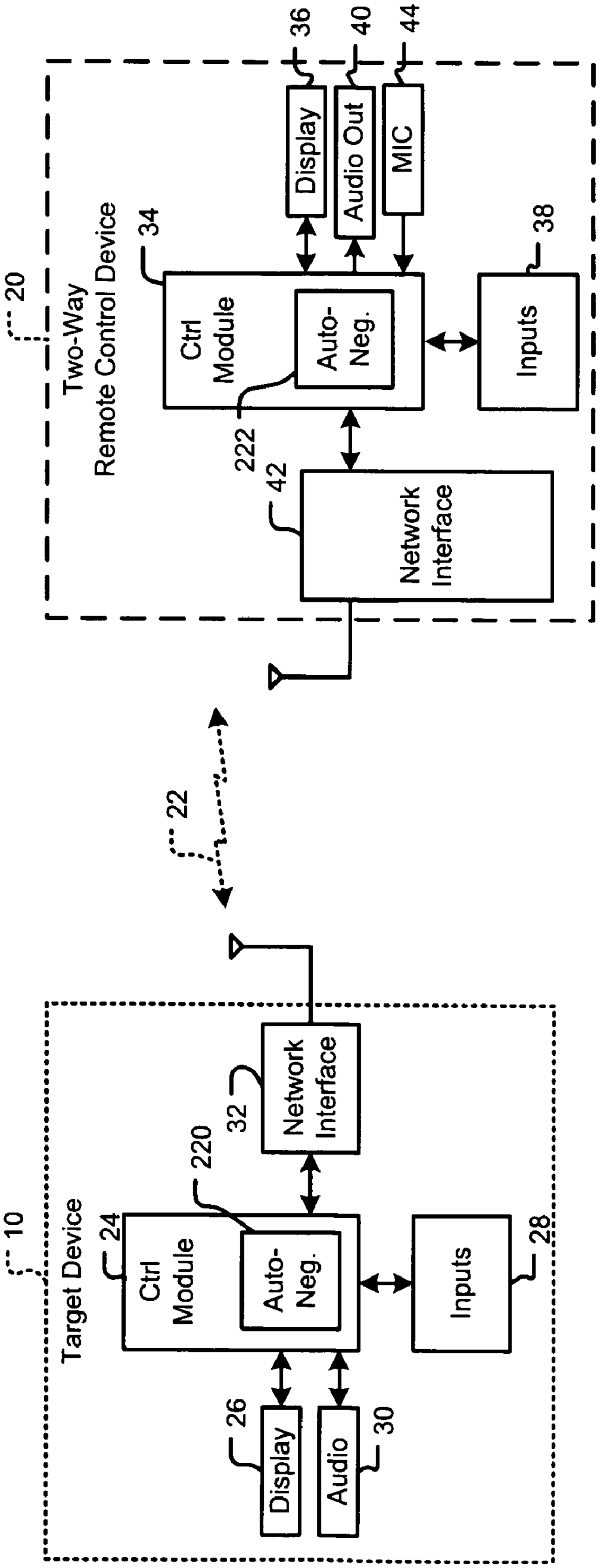
FIG. 7 is a functional block diagram of target devices and remote control devices that negotiate capabilities according to the present invention.

Referring now to FIG. 7, in some implementations the target device 10 includes an autonegotiation module 220 and the remote control device 20 includes an autonegotiation module 222. The autonegotiation modules 220 and 222 negotiate remote control capabilities and/or configure the remote control device 20 and/or the target device 10 by exchanging information relating to capabilities of the target device 10 and the remote control device 20.

For example, if a target device is a set top box for a TV or monitor, the set top box communicates capabilities, services and/or programming that are available from the set top box. For set top boxes, the capabilities, services and/or programming may include, for example, programming, pay per view, interactive TV, volume, video on demand, etc. Capabilities of a DVD player capabilities may include, for example, select, play, rewind, fast forward, skip, menu, etc.

Autonegotiation data may include at least one type selected from a group consisting of memory size of the remote control device, functions supported by the remote control device, remote functions supported by the target device, display size of the remote control device, display resolution of the remote control device, output resolution of the target device, cache size of the remote control device and processing power of the remote control device.

When the remote control device 20 has predefined input buttons, the target device 10 can send command pairs including buttons and their corresponding wireless control signals. Alternately, when the remote control device 20 has a touchpad input, the target device 10 can send button icons or symbols, the corresponding wireless control signals and/or additional information describing the function of the button. Additional information can be sent relating to page layouts for the display and/or user instructions. In other words, the touchpad may have multiple pages each including multiple buttons. The page layouts may be used to identify buttons on a particular page. The remote control device 20 can display subtitles, TV guides, previews, etc.

The remote control device 20 can receive streaming audio and comprises a speaker and/or headphone jack. In some implementations, the remote control device 20 further includes the microphone 44. The control module 34 of the remote control device 20 supports voice over internet protocol (VOIP) links. In other words, the target device 10 is connected to the internet and delivers voice over IP (VOIP) data to the remote control device 20.

Figure 8:
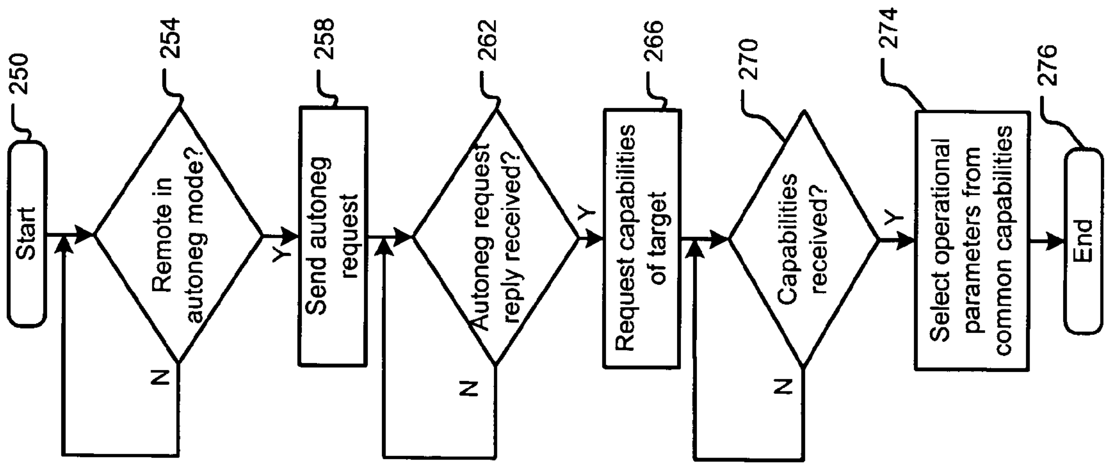
FIG. 8 is a flowchart illustrating steps for performing autonegotiation between the remote control device and the target device.

Referring now to FIG. 8, steps for performing autonegotiation between the remote control device 20 and the target device 10 are shown. Control begins with step 250. In step 254, control determines whether the remote control device 20 is in an autonegotiation mode. If false, control returns to step 254. Otherwise, control sends an autonegotiation request in step 258. In step 262, control determines whether an auto negotiation request reply is received. If false, control returns to step 262. In step 266, control request capabilities of the target device 10. In step 270, control determines whether the capabilities have been received from the target device 10. If false, control returns to step 270. Otherwise in step 274, control selects operational parameters from common capabilities of the target device 10 and the remote control device 20. Control ends in step 276.

As can be appreciated, steps with return loops can be associated with timers that timeout after a predetermined period. The common capabilities that are selected for operation during autonegotiation can include the parameters that are commonly available between the two devices and that will provide the highest performance, the lowest power consumption, and/or other criteria.

Figure 9A:
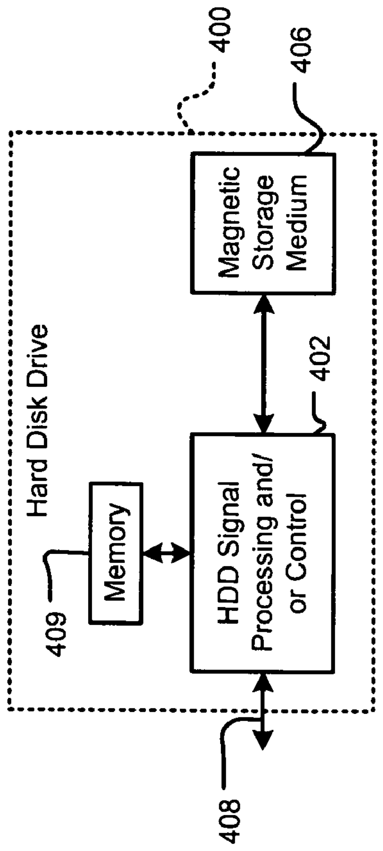
FIG. 9A is a functional block diagram of a hard disk drive.

Referring now to FIGS. 9A-9E, various exemplary implementations of the present invention are shown. Referring now to FIG. 9A, the present invention can be implemented in a hard disk drive 400. In other words, the hard disk drive may be the target device. In some implementations, the signal processing and/or control circuit 402 and/or other circuits (not shown) in the HDD 400 may process data, perform coding and/or encryption, perform calculations, and/or format data that is output to and/or received from a magnetic storage medium 406.

The HDD 400 may communicate with a host device (not shown) such as a computer, mobile computing devices such as personal digital assistants, cellular phones, media or MP3 players and the like, and/or other devices via one or more wired or wireless communication links 408. The HDD 400 may be connected to memory 409 such as random access memory (RAM), low latency nonvolatile memory such as flash memory, read only memory (ROM) and/or other suitable electronic data storage.

Figure 9B:
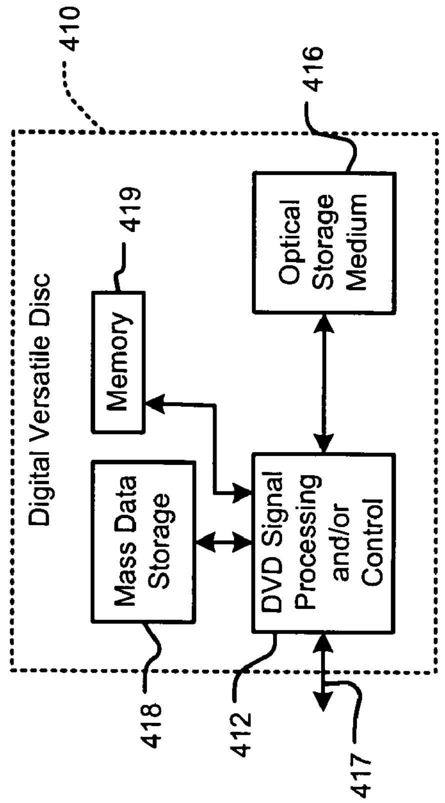
FIG. 9B is a functional block diagram of a digital versatile disk (DVD)

Referring now to FIG. 9B, the present invention can be implemented in a digital versatile disc (DVD) drive 410. In other words, the DVD may be the target device. The signal processing and/or control circuit 412 and/or other circuits (not shown) in the DVD 410 may process data, perform coding and/or encryption, perform calculations, and/or format data that is read from and/or data written to an optical storage medium 416. In some implementations, the signal processing and/or control circuit 412 and/or other circuits (not shown) in the DVD 410 can also perform other functions such as encoding and/or decoding and/or any other signal processing functions associated with a DVD drive.

The DVD drive 410 may communicate with an output device (not shown) such as a computer, television or other device via one or more wired or wireless communication links 417. The DVD 410 may communicate with mass data storage 418 that stores data in a nonvolatile manner. The mass data storage 418 may include a hard disk drive (HDD). The HDD may have the configuration shown in FIG. 9A. The HDD may be a mini HDD that includes one or more platters having a diameter that is smaller than approximately 1.8". The DVD 410 may be connected to memory 419 such as RAM, ROM, low latency nonvolatile memory such as flash memory and/or other suitable electronic data storage.

Figure 9C:
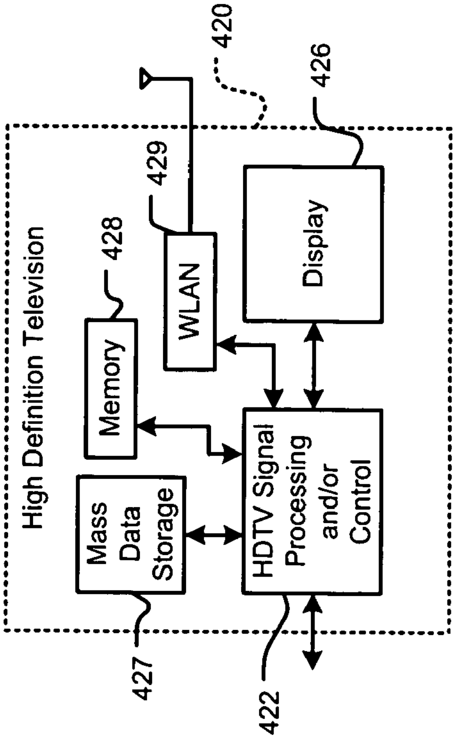
FIG. 9C is a functional block diagram of a high definition television.

Referring now to FIG. 9C, the present invention can be implemented in a high definition television (HDTV) 420. The HDTV may be the target device. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. At least one HDD may have the configuration shown in FIG. 9A and/or at least one DVD may have the configuration shown in FIG. 9B. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN network interface 429.

Figure 9D:
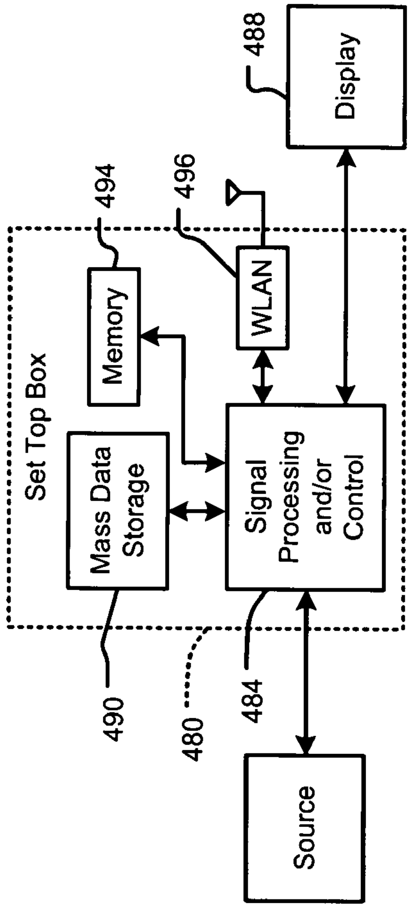
FIG. 9D is a functional block diagram of a set top box.

Referring now to FIG. 9D, the present invention can be implemented in a set top box 480. In other words, the set top box can be a target device. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Figure 9E:
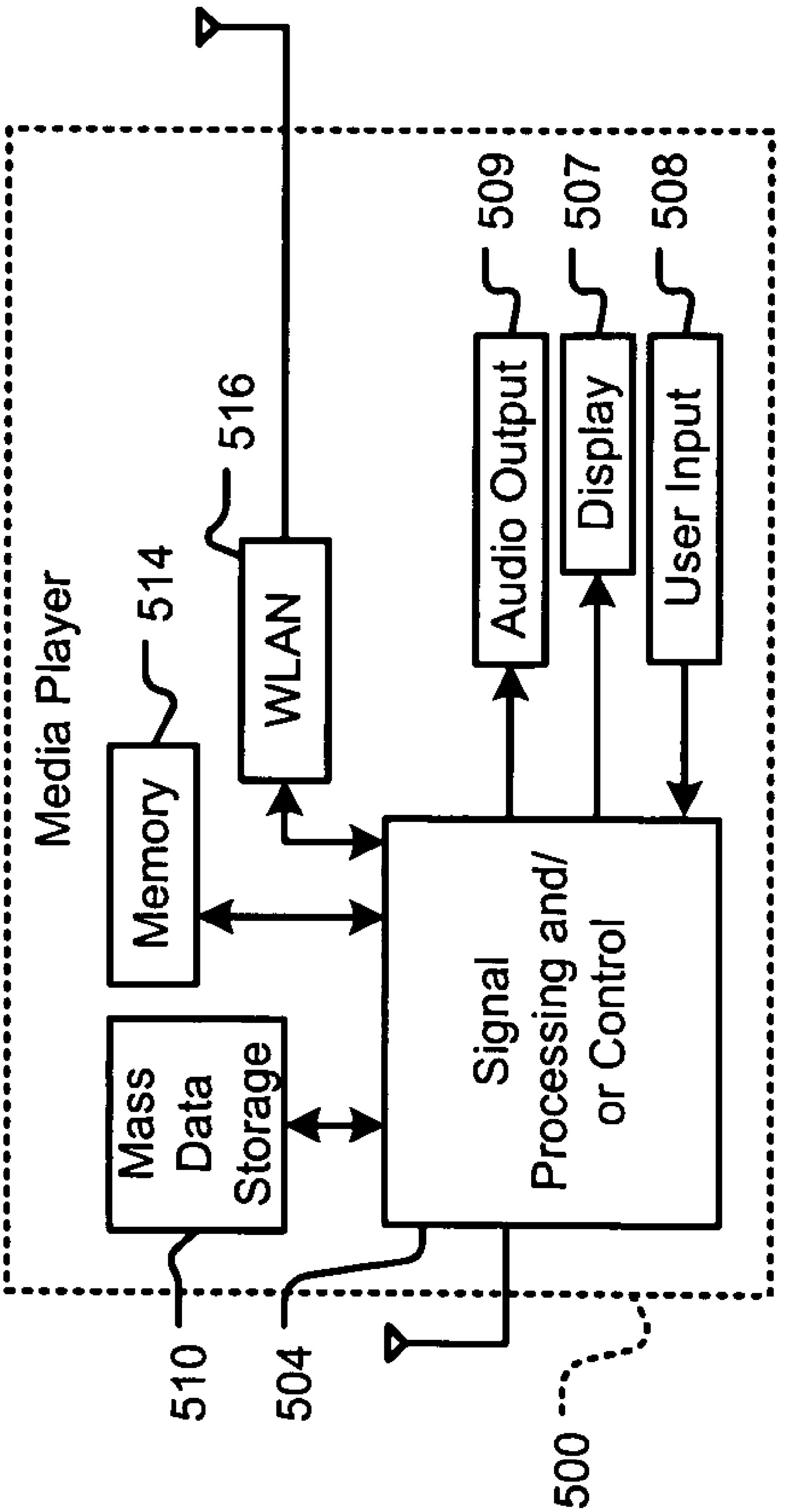
FIG. 9E is a functional block diagram of a media player.

Referring now to FIG. 9E, the present invention can be implemented in a media player 500. In other words, the media player can be a target device. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

Figure 10:
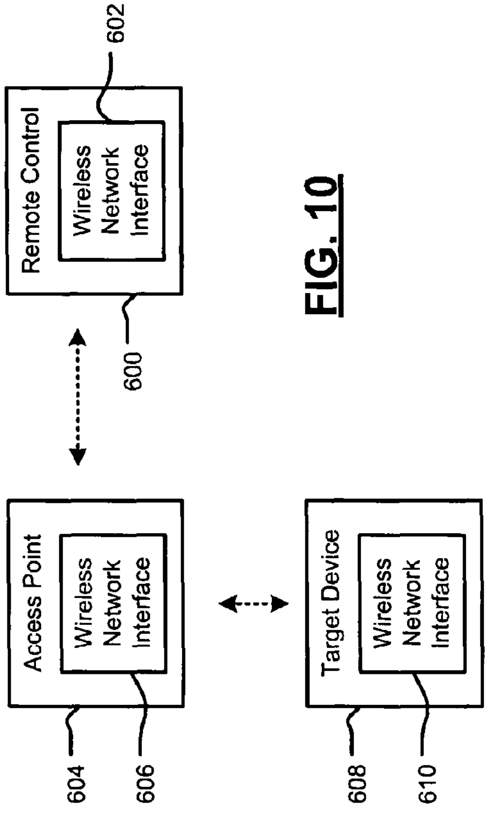
FIG. 10 is a functional block diagram of a remote control according to the present invention that controls a target device via a wireless access point.
Figure 11:
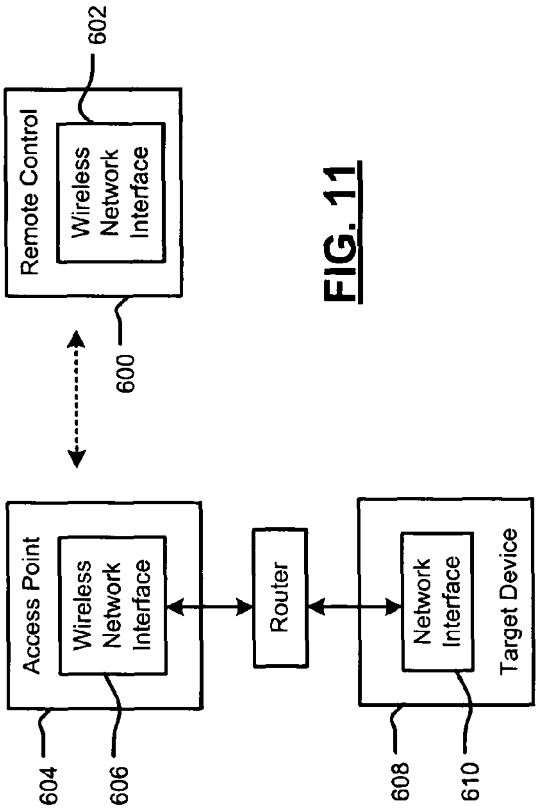
FIG. 11 is a functional block diagram of a remote control that according to the present invention that controls a target device via a router and access point.

Referring now to FIGS. 10 and 11, a remote control 600 according to the present invention includes a network interface 602 that wirelessly communicates with a wireless access point 604 that includes a wireless network interface 606. In FIG. 10, the access point 604 wirelessly relays controls packets to a target device 608, which includes a wireless network interface 610. In FIG. 11, the access point 604 relays control packets to the target device 608 via a wired connection. The access point 604 may include an integrated and/or standalone router 612. As can be appreciated, the access point may extend the range of the remote control to allow control of target devices that are not located in the same room and/or with a wireless range of the remote control. For example, some home sound systems include a rack of stereo equipment that is centrally located. The arrangements in FIGS. 10 and 11 may allow control of the equipment from anywhere in the house and/or other locations remote from the house.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A target device, comprising:

a wireless interface that transmits compressed data to and receives commands from a remote control device;

a control module that receives the commands and that adjusts operation of the target device based thereon;

a user input interface for locally adjusting operation of the target device;

a first tuner and a second tuner for respectively tuning a first channel and a second channel;

a local output device, wherein:

the target device outputs signals from the first tuner to the local output device;

the target device selectively outputs signals from the second tuner to the remote control device; and the control module performs at least one of data reduction and data compression on data to be sent to the remote control device; and an autonegotiation module that exchanges data with the remote control device relating to capabilities of at least one of the target device and the remote control device, wherein the data exchanged with the remote control device includes at least one of:

display size of the remote control device, display resolution of the remote control device, output resolution of the target device, and processing power of the remote control device.

2. The target device of claim 1, wherein the wireless interface is compliant with a protocol selected from a group consisting of IEEE standard 802.11 and IEEE standard 802.11 amendments 802.11a, 802.11b, 802.11g, 802.11h, 802.11n, 802.16, 802.20 and Bluetooth.

3. The target device of claim 1, wherein the wireless interface transmits streaming video data to the remote control device.

4. The target device of claim 1, wherein the wireless interface transmits streaming audio data to the remote control device.

5. The target device of claim 1, wherein the wireless interface transmits voice over Internet protocol (VOIP) data to the remote control device and receives voice data from the remote control device.

6. The target device of claim 1, wherein at least one of the output signals of the target device includes at least one of:

status information of the target device;

a channel guide; and close captions.

7. The target device of claim 1, wherein the target device has a unique network address.

8. The target device of claim 1, wherein the target device locally caches data at the remote control device.

9. A network system, comprising:

the target device of claim 1;

the remote control device; and an access point that wirelessly communicates with the remote control device and that relays the to the target device.

10. The network system of claim 9, wherein the access point communicates with the target device via one of a wired and a wireless connection.

11. The target device of claim 1, wherein the data exchanged with the remote control device includes:

memory size of the remote control device;

cache size of the remote control device.

12. A target device, comprising:

a wireless interface that transmits compressed data to and receives commands from a remote control device;

a control module that receives the commands and that adjusts operation of the target device based thereon;

a user input interface for locally adjusting operation of the target device, wherein the target device locally caches data at the remote control device; and an autonegotiation module that exchanges data with the remote control device relating to capabilities of at least one of the target device and the remote control device, wherein the data that is exchanged with the remote control device includes:

memory size of the remote control device;

display size of the remote control device;

display resolution of the remote control device;

output resolution of the target device;

cache size of the remote control device; and processing power of the remote control device.

13. A method for operating a target device, the method comprising:

providing a wireless interface;

transmitting configuration data to a remote control device;

receiving commands from the remote control device;

adjusting operation of the target device based on the commands;

tuning first and second channels in a source signal;

outputting the first channel to a local output device at the target device;

selectively outputting signals from the second channel to the remote control device;

performing at least one of data reduction and data compression on data to be sent to the remote control device; and exchanging data with the remote control device relating to capabilities of at least one of the target device and the remote control device, wherein the data comprises at least one of:

display size of the remote control device, display resolution of the remote control device, output resolution of the target device, and processing power of the remote control device.

14. The method of claim 13, wherein the wireless interface is compliant with a protocol selected from a group consisting of IEEE standard 802.11 and IEEE standard 802.11 amendments 802.11a, 802.11b, 802.11g, 802.11h, 802.11n, 802.16, 802.20 and Bluetooth.

15. The method of claim 13, further comprising transmitting streaming video data to the remote control device using the wireless interface.

16. The method of claim 13, further comprising transmitting streaming audio data to the remote control device using the wireless interface.

17. The method of claim 13, further comprising transmitting voice over Internet protocol (VOIP) data to the remote control device and receiving voice data from the remote control device using the wireless interface.

18. The method of claim 13, wherein at least one of the output signals of the target device includes at least one of:

status information of the target device;

a channel guide; and close captions.

19. The method of claim 13, further comprising assigning the target device a unique network address.

20. The method of claim 13, further comprising locally caching data at the remote control device.

21. The method of claim 13, wherein the data that is exchanged with the remote control device includes at least one type selected from a group consisting of:

memory size of the remote control device;

functions supported by the remote control device;

remote functions supported by the target device; and cache size of the remote control device.

22. The method of claim 13, further comprising using an access point to wirelessly communicate with the remote control device and to relay the commands to the target device.

23. The method of claim 22, wherein the access point communicates with the target device via one of a wired and a wireless connection.

24. A target device, comprising:

wireless interface means for transmitting configuration data to and receiving commands from a remote control device;

control means for receiving the commands and for adjusting operation of the target device based thereon;

user input interface means for locally adjusting operation of the target device;

first and second tuning means for tuning channels in a source signal;

local output means for outputting one of audio and video signals, wherein:

the target device outputs signals from the first tuning means to the local output means;

the target device selectively outputs signals from the second tuning means to the remote control device;

the control means performs at least one of data reduction and data compression on data to be sent to the remote control device; and autonegotiation means for exchanging data with the remote control device relating to capabilities of at least one of the target device and the remote control device, wherein the data exchanged with the remote control device includes at least one of:

functions supported by the remote control device;

remote functions supported by the target device;

output resolution of the target device; and processing power of the remote control device.

25. The target device of claim 24, wherein the wireless interface means is compliant with a protocol selected from a group consisting of IEEE standard 802. 11 and IEEE standard 802.11 amendments 802.11a, 802.11b, 802. 11g, 802.11h, 802.11n, 802.16, 802.20 and Bluetooth.

26. The target device of claim 24, wherein the wireless interface means transmits streaming video data to the remote control device.

27. The target device of claim 24, wherein the wireless interface means transmits streaming audio data to the remote control device.

28. The target device of claim 24, wherein the wireless interface means transmits voice over Internet protocol (VOIP) data to the remote control device and receives voice data from the remote control device.

29. The target device of claim 24, wherein at least one of the output signals of the target device includes at least one of:

status information of the target device;

a channel guide; and close captions.

30. The target device of claim 24, wherein the target device has a unique network address.

31. The target device of claim 24, wherein the target device locally caches data at the remote control device.

32. The target device of claim 24, wherein the data that is exchanged with the remote control device includes at least one type selected from a group consisting of:

memory size of the remote control device; and cache size of said remote control device.

* * * * *